United States Patent Office

3,213,063
Patented Oct. 19, 1965

3,213,063
POLYESTERS FROM BENZOPHENONE TETRA-CARBOXYLIC ACID AND CURED PRODUCTS THEREOF
James E. Horan, Chicago, Ill., and Richard E. Van Strien, Griffith, Ind., assignors to Standard Oil Company, Chicago, Ill., a corporation of Indiana
No Drawing. Filed May 21, 1962, Ser. No. 196,505
7 Claims. (Cl. 260—63)

This invention relates to resins of the polycondensation reaction type and characterized by thermosetting properties and more particularly to resins derived from aromatic tetracarboxylic acids.

Benzene tricarboxylic acids such as trimellitic anhydride have been used in the past in preparing baking resins of the polycondensation reaction type, including both those soluble in organic solvents and those soluble in water. These resins are suitable for forming baked coatings without the addition of curing agents. Baked coatings from these resins have been utilized as protective surface coatings and exhibit many desirable properties such as gloss, hardness and flexibility.

However, the baking conditions of these resins has not been entirely satisfactory. Under the usual minimum conditions of time (25–30 minutes), the baking temperature is approximately 400° F., a temperature considered too high for many commercial applications and a lower baking temperature is desired. Lower baking temperatures reduce the danger of fires, aid in solvent recovery, reduce the necessary protective insulation on the application equipment, reduce the temperature effects on the material to be coated, etc.

One object of this invention is a baking resin of the polycondensation reaction type which is suitable for protective baked coatings which bake below 400° F. in 25–30 minutes. Another object is a baking resin of the polycondensation reaction type which is suitable for protective baked coatings which bake below 400° F. in 25–30 minutes and exhibit good properties of gloss, hardness, and flexibility. Other objects of this invention will become apparent from the detailed description of this invention.

It has been discovered that an organic solvent soluble resin produced from a benzophenone tetracarboxylic acid, is suitable for the preparation of protective surface coatings which bake at approximately 350° F. (in 25–30 minutes), a temperature considerably below the higher 400° F. It has also been discovered that the organic solvent soluble resin when reacted with an alkaline agent produces a water soluble resin which is suitable for the preparation of protective surface coatings which bake at approximately 350° F. In addition, it has been discovered that the baked coatings from the organic solvent soluble resin and water soluble resin exhibit many desirable properties such as gloss, hardness, flexibility and impact strength; and that these resins are capable of being cured with an aromatic diisocyanate to produce surface coatings having very desirable properties.

ORGANIC SOLVENT SOLUBLE RESIN

The organic solvent soluble baking resin comprises the polycondensation reaction product of a benzophenone tetracarboxylic acid, a polyhydric aliphatic alcohol having at least 2 hydroxyl groups and an aliphatic dicarboxylic acid.

The benzophenone tetracarboxylic acid may have three carboxyl groups on one phenyl group and one carboxyl group on the other phenyl group, or two carboxyl groups on each phenyl group with the latter structure being preferred. Such acids include 2,2′,3,3′-benzophenone tetracarboxylic acid and its anhydrides, 2,2′,4,4′-benzophenone tetracarboxylic acid, 2,2′,6,6′-benzophenone tetracarboxylic acid, 3,3′,4,4′-benzophenone tetracarboxylic acid and its anhydrides, 3,3′,5,5′-benzophenone tetracarboxylic acid, and the acids having one arrangement on one phenyl group and another on the other phenyl group such as 2,2′,3,4′-tetracarboxylic acid and anhydride, 2,2′3,5′-tetracarboxylic acid and anhydride, 2,3′,4,5′-tetracarboxylic acid and anhydride, etc. Those acids having the carboxyl groups in non-ortho (meta and para) positions with respect to the keto group of the benzophenone are especially desirable since these do not form lactams. 3,3′,4,4′-benzophenone tetracarboxylic acid and its anhydrides are preferred because of their availability and the highly desirable results produced by these acids.

The tetracarboxylic acid may be unsubstituted or substituted. The substituents should not be hydroxyl or amino groups which would react with the starting materials for the resin, but may include such groups as alkyl, especially, the methyl, ethyl and butyl groups; and halo, especially, the chloro and bromo groups.

The polyhydric alcohol has at least 2 hydroxyl groups and refers generally to the aliphatic (alkyl and alkenyl) alcohols, with the alkyl alcohols or saturated hydrocarbon alcohols being preferred. Such alcohols include the well-known alkylene glycols, glycerol, tetrahydroxy alcohols, and hexahydroxy alcohols such as ethylene glycol, propylene glycol, hexamethylene glycol, diethylene glycol, triethylene glycol, glycerol, trimethylol-propane, erythritol, pentaerythritol, dipentaerythritol, mannitol, and sorbitol. The alkylene glycols are preferred, especially, those having from 2 to about 10 carbon atoms and particularly those having from 2 to about 6 carbon atoms. The lower molecular weight glycols tend to impart better hardness to the resins than the higher molecular weight glycols.

The branch chain alcohols, especially, the branch chain glycols, are highly beneficial for the baking resin in that the coatings prepared from the resin exhibit good gloss, flexibility and hardness, a very desirable combination of properties. Suitable branch chain glycols include propylene glycol (1,2-propanediol), butylene glycols (1,2-butanediol, etc.), heptylene glycols (2,2-dimethyl 1,3-propylene glycol or neopentyl glycol, etc.), hexylene glycols (2,3-hexanediol, etc.), etc. An especially desirable glycol is neopentyl glycol (2,2-dimethyl propylene glycol).

The dicarboxylic acid refers generally to aliphatic (alkyl and alkenyl) dicarboxylic acids, with the alkane-dioic acids (paraffinic) being preferred, especially, those having from 4 to about 10 carbon atoms. The lower molecular weight acids tend to impart better toughness and flexibility to the baked coatings from the resins. Such alkylene dicarboxylic acids include succinic, glutaric, adipic, suberic, sebacic and the like. An especially suitable acid is adipic acid.

In addition to the above reactants (tetracarboxylic acid, alcohol, and dicarboxylic acid), an aliphatic monohydroxy alcohol and preferably an alkanol may be included in the formulation for the baking resin. Such alcohols include those having from 1 to about 12 carbon atoms such as methyl alcohol, ethyl alcohol, butyl alcohol, hexyl alcohol, octyl alcohol (including isooctyl alcohol), dodecyl alcohol, and the like.

The polycondensation reaction product may be obtained by using individual benzophenone tetracarboxylic acids (or anhydrides), individual dicarboxylic acids or individual polyols, (and individual monohydroxy alcohols) or a mixture of benzophenone tetracarboxylic acids or dicarboxylic acids or polyols (or monohydroxy alcohols).

The characteristics of the polycondensation reaction product are dependent upon the type of reactants, and upon the mole ratios existing among the reactants. In general, the mole ratio of the defined benzophenone tetracarboxylic acid to the defined dicarboxylic acid is from about 0.5 to about 3. Ratios of reactants outside the spelled out range may be utilized for production of resins having special properties. Usually, the mole ratio of defined benzophenone tetracarboxylic acid to defined dicarboxylic acid is between about 0.5 and about 2. However, resins produced from the defined acids (especially 3,3',4,4'-benzophenone tetracarboxylic acid and adipic acid) in a ratio between about 0.8 and about 1.2 produce coatings which exhibit good gloss, flexibility, hardness, impact strength and appearance, a highly desirable combination of properties. Accordingly, this ratio (about 0.8 to about 1.2) is preferred. The polyol is generally charged in an amount such that the hydroxy to carboxyl ratio of the reactants is about 1.3–1.6 and preferred to be about 1.3–1.55 for polycondensation reaction products having higher molecular weights are desired.

When a monohydroxy alcohol is also present, it is desirable to have a mole ratio of defined polyol to monohydroxy alcohol between 0.5 and 10. It is to be understood that the amount of monohydroxy alcohol may be less than this amount or more than this amount, dependent upon the desired characteristics of the final product. In many instances, the monohydroxy alcohol imparts beneficial solubility and viscosity to the resin.

The polycondensation reaction product is desirably prepared under conditions of reaction such that the resin has an Acid Number the lowest possible commensurate with avoiding gelation. In general, the Acid Number of the product will be between about 10 and 100 and preferably between about 40 to 70 to avoid gelation on the lower end of the range.

The polycondensation reaction products possess the common characteristic of forming "rigid" thermoset solids when baked at temperatures in the order of 350° F. in the presence of oxygen or air. In general, the products made from the benzophenone tetracarboxylic acids, alkanedioic acids, and lower glycols form very suitable thermoset materials at 350° F. in 30 minutes. Resin coatings from some of the tetracarboxylic acids will bake at temperatures slightly below 350° F. and some slightly above 350° F. at 30 minutes.

The resins of the invention have utility in the broad field of rigid plastics now occupied by materials such as phenol formaldehyde resins and filled melamine-formaldehyde resins. The resins may also be used as binders for laminations such as plywood forming and fiber glass reinforced plastics. In both of these uses, the resins are particularly good because no curing agent need be added to the product in order to obtain good rigidity or suitably short curing times. The resins also require substantially less tetracarboxylic acid than the resins derived from trimellitic anhydride to produce baked coatings having equivalent hardness properties.

The polycondensation reaction products in themselves are excellent film-formers when dissolved in oxygenated organic solvents for use in the formation of baked surface coatings. The resin in solvent solution may have pigments introduced therein, in order to produce enamel finishes which possess good gloss.

The polycondensation reaction products are soluble in the oxygenated organic solvents commonly used in the surface coating field. The better known of these solvents are alcohols such as methyl and butyl alcohols, and ketones such as acetone and methylethylketone. Also, these materials may be dissolved in the commonly used mixtures of benzene hydrocarbons such as toluene and xylene with an oxygenated organic solvent; a typical mixed solvent consists of a 60:40 volume ratio of mixed xylenes and butanol.

The polycondensation reaction is carried out in normal fashion. However, the nature of some of the reactants makes it preferable to have in the reaction zone at least one liquid reactant. The liquid reactant may be naturally liquid or liquid at the temperature of the polycondensation reaction. In the case of a normally liquid reactant, all the reactants are charged into the reaction zone and all reactants brought to the reaction temperature simultaneously. Where all the reactants are normally solid, it is preferred to add the lowest melting reactant to the reaction zone first and produce a liquid material by raising the temperature to the melting point; then the other reactants are introduced and the whole brought to the desired reaction temperature. Also, the reactants may be added in order of melting point in sequence in order to have the material in the reaction zone substantially liquid at all times. It is to be understood that, regardless of the method of addition of the reactants, all of the reactants are, for practical purposes, simultaneously present throughout the reaction (cooking) time.

Baked coatings may be prepared from the organic solvent soluble resin or the resin containing the polycondensation reaction product may be reacted with an alkaline agent to produce a water soluble resin which may be used for the baked coatings. The water soluble resins are generally preferred because of the lower fire hazards with water and ease of cleaning the application equipment.

WATER SOLUBLE RESIN

The water soluble baking resin of the invention comprises the reaction product of the polycondensation reaction product and an alkaline reacting material. The product and the alkaline material are reacted until a water soluble resin is obtained. The amount of alkaline reacting material is most readily determined by following the pH of the reaction medium. An aqueous reaction medium is preferred when the water soluble resin is to be used for surface coating applications because the desired water solution is obtained immediately. When the polycondensation reaction product and aqueous reaction medium are contacted in the presence of an alkaline reacting material, the polycondensation reaction product passes into solution substantially completely at a pH of about 5. In practically all instances, the polycondensation reaction product will be in complete solution at a pH of about 6. The use of alkaline reacting material in excess of that needed to bring all the polycondensation reaction product into solution is not harmful, at least up to a water solution pH of about 8. It is preferred to have the aqueous solution somewhat on the acid side or neutral, i.e., a pH of from 6 to 7.

The alkaline reacting material may be any material which reacts with acidity to produce a more neutral product. Ammonia (as the hydroxide) is particularly suitable when aqueous reaction medium is desired. The hydrocarbon amines, particularly the lower molecular weight containing not more than 4 carbon atoms in each aliphatic group, are suitable. The amino aliphatic alcohols, such as ethanolamines are suitable. The heteroamines, such as morpholine and piperidine may be used. The type of alkaline reacting material used is determined in part by the characteristics desired in the final water soluble resin; also, by the type of polycondensation reaction product which is to be converted to a water soluble form. Preferred materials are aqueous ammonia, and the lower molecular weight alkylamines, such as ethylamines and butylamines and especially the tertiary amines such as triethylamine.

The neutralization reaction is carried out by contacting the polycondensation reaction product and the alkaline reacting medium, when necessary in the presence of a liquid reaction medium; particularly suitable reaction mediums are oxygenated organic solvents and water. When water is used as the liquid reaction medium, it is preferred that it be warm, i.e., maintained in the region of 100–160° F.; the polycondensation reaction product is added to the aqueous alkaline reacting material and the two agitated until the product has passed into solution.

The water soluble resin behaves in essentially the same manner as the organic solvent soluble resin when exposed to oxygen or air at elevated temperatures in that an air-baked or cured thermoset solid is formed. At temperatures on the order of 350° F., the water soluble resin produces hard films on metal surfaces in times of 25-30 minutes. An outstanding characteristic of the products of the invention is that the water soluble resin possesses essentially the identical thermosetting properties of the water insoluble polycondensation reaction product.

In addition to their high solubility, which may be as much or more than 50 percent by weight, the water soluble resins are also soluble in the ordinary oxygenated organic solvents as well as in mixtures of these with benzene hydrocarbons. Because of its cheapness and safety, water is the preferred solution for surface coating applications and also as an aqueous reaction medium.

DIISOCYANATE CURED RESINS

Rather than being converted into a water soluble resin, the polycondensation reaction product (soluble in organic solvents) may be treated with an aromatic diisocyanate in the presence of a catalyst such as N-ethyl morpholine, to produce baked surface coatings.

The aromatic diisocyanate includes such aromatic members as toluylene diisocyanate, 1,5-naphthylene diisocyanate, nitrobenzidine diisocyanate and the like.

The catalyst includes such members as N-ethyl morpholine and stannous octoate.

Generally, the defined diisocyanate is added to the polycondensation reaction product in an amount such that the ratio of isocyanate to hydroxyl (calculated from the polyol used in the product) groups is from about 0.3 to about 2 and preferably from about 0.5 to 0.9 since this latter range results in heat cured baked resins having a highly desirable combination of properties (gloss, impact strength, hardness, and flexibility).

The defined diisocyanate and polycondensation reaction products are generally mixed together at atmospheric temperatures. Usually, some reaction between the two materials occurs even at the lower temperatures. In time, this reaction tends to increase the viscosity of the solution which may or may not be desirable depending on the application. The viscosity of the solution generally remains very suitable for the preparation of baked resin coatings under the usual conditions, for 2-4 hours after the addition of diisocyanate to the polycondensation reaction product.

The resin coating prepared from the reaction of the diisocyanate and polycondensation reaction product in the organic solvent soluble resin is baked from 20 minutes to an hour depending on the temperature. Suitable temperatures are in the order of 200-400° F. and especially 250-300° F.

Examples I-III pertain to water-soluble resins of this invention.

Example I 2 moles of 3,3',4,4'-benzophenone tetracarboxylic acid, 7 moles of propylene glycol and 1 mole of adipic acid were added to a 300 ml., 4 neck, round bottom flask fitted with a stirrer, thermometer, nitrogen sparge and Barrett receiver attached to a condenser. The mixture had an OH/COOH ratio of about 1.4 and was heated at about 340° F. for about 3 hours with the removal of the water of reaction. The final Acid Number of the resin was 84.

An enamel was then prepared. The resin was dissolved in water to a 50% solids concentration using triethylamine as the solubilizer. The final pH of the solution was 6-7. The resin solution was pigmented with $TiO_2$ at a pigment to resin ratio of 0.9:1 and the resulting mixture milled to a 7 N.S. fineness. A film (1.0 ml) was cast on a tin plate using a Boston-Bradley adjustable knife and allowed to dry for half an hour and then baked at about 350° F. for about 30 minutes.

The baked coating or film had a gloss (60°) of 76, did not soften when a few drops of acetone were placed on the film, and did not crack when the test panel was given a 180° bend around a ⅛ inch steed rod. The Sward hardness of the coating was 50, its pencil hardness was 4H, and it was not damaged by an impact of 20 in. lbs. There was some cratering and yellowing of the coating.

These results demonstrate that 3,3',4,4'-benzophenone tetracarboxylic acid was suitable for use in the preparation of a baking resin which produced baked coatings at 350° F. in about 30 minutes, and that the baked coating derived from the resin exhibited good properties of gloss (76) and flexibility (passed bend test).

A resin is prepared from trimellitic anhydride (3 moles), propylene glycol (7 moles) and adipic acid (1 mole). Coatings from this resin are not satisfactorily baked at 350° F. for 25-30 minutes in that they do not pass the acetone test. These coatings require approximately 400° F. at 25-30 minutes to produce suitable coatings.

Example II

A second resin was prepared from 2 moles of 3,3',4,4'-benzophenone tetracarboxylic acid, 5.5 moles of propylene glycol, 1 mole of adipic acid and 2 moles a isooctyl alcohol by the procedure of Example I with the temperature being about 350° F. and the time about 5.5 hours. The OH/COOH ratio was about 1.3. The final acid number was 72.

An enamel was prepared by the procedure of Example I. A film (0.9 mil) was cast on a tin plate and baked at about 370° F. for about 30 minutes.

The baked coating or film had a gloss (60°) of 64, passed the acetone test, and did not crack when the test panel was given a 180° bend around a ⅛ inch steel rod. The Sward hardness, pencil hardness and impact rating were 15, 3H and 18 in. lbs., respectively. This coating also exhibited some cratering and yellowing.

These results demonstrate that the isooctyl alcohol (a monohydroxy alcohol) may be used in addition to the polyol in the formulation of a baking resin and that the baked coating (350° F.) from this resin exhibited good properties of gloss (64) and flexibility.

Example III

A third resin was prepared from 1 mole of 3,3',4,4'-benzophenone tetracarboxylic acid, 2.25 moles of propylene glycol, 2.25 moles of neopentyl glycol and 1 mole of adipic acid by the procedure of Example I with the temperature being about 355° F. and time being about 3.5 hours. The OH/COOH ratio was about 1.5. The final acid number was 58.

An enamel was prepared by the procedure of Example I. A film (1.0 mil) was cast on a tin plate and baked at about 360° F. for about 30 minutes.

The baked film had a gloss (60°) of 72, passed the acetone test, and did not crack when the test panel was given a 180° bend around a ⅛ inch steel rod. The pencil hardness and impact rating were 5H, and 80 in. lbs., respectively. No cratering or yellowing was noted in the film.

These results demonstrate that a mole ratio of the benzophenone tetracarboxylic acid to adipic acid of 1, a mole ratio of neopentyl glycol to propylene glycol or 1, and a ratio of OH/COOH of 1.5 produced a baked coating (at 360° F. for 30 minutes) which exhibited a highly desirable combination of properties. In addition to the gloss rating of 72, the resin coating exhibited good flexibility, hardness (5H) impact strength (80 in. lbs.) and appearance (no cratering or yellowing). This combination of properties was considered excellent.

Examples IV-V

A sample of the organic solvent soluble resin having an OH/COOH ratio of 1.5 and described in the first paragraph of Example III was dissolved in equal parts by weight of methyl isobutyl ketone and pigmented with 1 part of $TiO_2$ per 3 parts of the resin solids. The resin was divided into two samples. Toluylene diisocyanate (80% 2,4-TDI, 20% 2,6-TDI) was added to the first and second samples to give isocyanate to hydroxyl ratios of 1.15 (resin A) and 0.65 (resin B), respectively.

*Example IV*

A film (2.0 mils) was cast from resin A and baked at about 300° F. for about 0.5 hour. The baked film had a gloss (60°) of 77, passed the 180° bend test and had a pencil hardness of 4H and an impact strength of 17 in. lbs. No cratering or pinholing was noted.

These results demonstrate that a useful baked coating had been prepared which exhibited good properties of gloss (77), hardness (4H), flexibility and appearance (no cratering or pinholing).

*Example V*

A film (2.0 mils) was prepared from resin B and baked at about 300° F. for about 0.3 hour. The baked film had a gloss (60°) of 95, passed the 180° bend test and had a pencil hardness of 7H and an impact strength of 72 in. lbs. No cratering or pinholing was noted.

These results demonstrate that an isocyanate to hydroxyl ratio of 0.65 in the formulation of resin B produced a coating which exhibited an excellent combination of properties as noted by the gloss (95), flexibility, hardness (7H), impact strength (72 in. lbs.), and appearance (no cratering or pinholing).

Thus having described the invention, what is claimed is:

1. As a baking resin, a thermoset polyester comprising a polycondensation reaction product of (a) benzophenone tetracarboxylic acid, (b) alkylene glycol having from 2 to about 10 carbon atoms, and (c) alkylene dicarboxylic acid having from 4 to about 10 carbon atoms, wherein the tetracarboxylic acid is present in a mole ratio to the dicarboxylic acid of from about 0.8 to about 1.2 and at least about 40 mole percent of the glycol is present as neopentyl glycol and the reaction product has an acid number of about 40–70.

2. As a heat-cured baking resin, a thermoset polyester comprising the reaction product of (1) toluene diisocyanate and (2) the polycondensation reaction product of claim 1, the isocyanate groups of said toluene diisocyanate being present in a ratio to the hydroxyl goups of said glycol of from about 0.5 to about 0.9.

3. As a water soluble baking resin, a thermoset polyester comprising the reaction product of (1) an alkaline agent and (2) the polycondensation reaction product of claim 1, said alkaline agent being a member selected from the group consisting of ammonia, aliphatic amine, and amino aliphatic alcohol.

4. The polyester of claim 3 wherein said tetracarboxylic acid is 3,3',4,4'-benzophenone tetracarboxylic acid.

5. The polyester of claim 3 wherein the alkylene glycol is neopentyl glycol.

6. The polyester of claim 3 wherein said dicarboxylic acid is adipic acid.

7. The polyester of claim 3 wherein said agent is triethylamine.

References Cited by the Examiner

UNITED STATES PATENTS

| | | | |
|---|---|---|---|
| 1,813,838 | 7/31 | Bruson | 260—63 |
| 2,962,469 | 11/60 | Phillips et al. | 260—75 |
| 3,008,933 | 11/61 | Wielicki et al. | 260—75 |
| 3,015,650 | 1/62 | Schollenberger | 260—76 |
| 3,067,157 | 12/62 | Husch et al. | 260—75 |

WILLIAM H. SHORT, *Primary Examiner.*

JOSEPH R. LIBERMAN, *Examiner.*